US009267410B2

(12) United States Patent
Gong et al.

(10) Patent No.: US 9,267,410 B2
(45) Date of Patent: Feb. 23, 2016

(54) INJECTOR COOLING APPARATUS

(71) Applicant: Caterpillar Inc., Peoria, IL (US)

(72) Inventors: Xiaohui Gong, Dunlap, IL (US); Matthew F. Fahrenkrug, Chillicothe, IL (US); Dongming Tan, Dunlap, IL (US); Amarnath Nelli, Peoria, IL (US); Na Cai, Peoria, IL (US); Ivan Palmer, Cambs (GB)

(73) Assignee: Caterpillar Inc., Peoria, IL (US)

( * ) Notice: Subject to any disclaimer, the term of this patent is extended or adjusted under 35 U.S.C. 154(b) by 95 days.

(21) Appl. No.: 14/154,295

(22) Filed: Jan. 14, 2014

(65) Prior Publication Data

US 2015/0198075 A1 Jul. 16, 2015

(51) Int. Cl.
*F01N 3/02* (2006.01)
*F01N 3/20* (2006.01)

(52) U.S. Cl.
CPC ........... *F01N 3/2066* (2013.01); *F01N 2610/02* (2013.01); *F01N 2610/11* (2013.01)

(58) Field of Classification Search
CPC ......... F04B 9/02; F02D 41/029; F01N 9/002; F01N 3/0842; F01N 3/035; F01N 13/02
USPC ............ 60/274, 273, 295, 301, 320; 417/223; 137/310, 338, 339, 340; 239/132, 128, 239/132.1, 132.5, 133
See application file for complete search history.

(56) References Cited

U.S. PATENT DOCUMENTS

| | | | | |
|---|---|---|---|---|
| 8,122,710 | B2 | 2/2012 | Schmale et al. | |
| 8,241,598 | B2 | 8/2012 | Frederiksen | |
| 2004/0025498 | A1* | 2/2004 | Lambert et al. | 60/286 |
| 2007/0163246 | A1 | 7/2007 | Wassmur | |
| 2008/0209890 | A1 | 9/2008 | Cox et al. | |
| 2009/0217650 | A1* | 9/2009 | Haeberer et al. | 60/297 |
| 2010/0132338 | A1* | 6/2010 | Schmale et al. | 60/287 |
| 2010/0319651 | A1* | 12/2010 | Kasahara | 123/198 R |
| 2011/0146240 | A1 | 6/2011 | Wilhelm et al. | |
| 2011/0179772 | A1 | 7/2011 | Vieth | |
| 2011/0243818 | A1* | 10/2011 | Frederiksen | 423/212 |
| 2013/0000281 | A1 | 1/2013 | Merchant et al. | |
| 2013/0000729 | A1 | 1/2013 | Mokire et al. | |
| 2013/0291523 | A1 | 11/2013 | Shah et al. | |
| 2014/0250873 | A1* | 9/2014 | Myer et al. | 60/300 |
| 2014/0369899 | A1* | 12/2014 | Fahrenkrug et al. | 422/173 |

FOREIGN PATENT DOCUMENTS

| | | | |
|---|---|---|---|
| DE | 10324482 | A1 | 12/2004 |
| DE | 102011102851 | A1 * | 1/2012 |
| JP | 2011080397 | A * | 4/2011 |
| WO | 2013028741 | A1 | 2/2013 |
| WO | 2013035112 | A1 | 3/2013 |
| WO | WO 2013035112 | A1 * | 3/2013 |

* cited by examiner

*Primary Examiner* — Patrick Maines
(74) *Attorney, Agent, or Firm* — Baker & Hostetler LLP

(57) ABSTRACT

A cooling system for an injector tip for a diesel emission fluid (DEF) injection system is disclosed. The system uses a heat sink, such as a head for a regeneration system, to vaporize cooling fluid, in combination with a phase separation tank, to force cooling fluid backward through a cooling loop thereby allowing cooling of an injector tip following engine shutdown in a "hot" shutdown situation.

20 Claims, 3 Drawing Sheets

8
40
38
44
46
42
34
32
28
36
30
26
22
25
14
20
12
10
16
7

INJECTOR COOLING APPARATUS

TECHNICAL FIELD

The present disclosure relates generally to selective catalytic reduction (SCR) systems that employ a fluid reductant, referred to as diesel emission fluid (DEF), by injecting the DEF into the exhaust stream upstream of a catalytic converter. More specifically, this disclosure relates to protecting an injector tip used in such systems from overheating in "hot" shutdown situations.

BACKGROUND

Power systems for engines, factories, and power plants produce emissions that contain a variety of regulated exhaust constituents. These regulated exhaust constituents may include, for example, particulate matter (e.g., soot), nitrogen oxides (NOx), and sulfur compounds. Due to heightened environmental concerns, engine exhaust emission standards have become increasingly stringent. In order to comply with emission standards, engine manufacturers have developed and implemented a variety of exhaust after-treatment components to reduce pollutants in exhaust gas prior to the exhaust gas being released into the atmosphere. The exhaust after-treatment components may include, for example, a diesel particulate filter (DPF), one or more selective catalytic reduction (SCR) devices, a diesel oxidation catalyst, a heat source for regeneration of the DPF, an exhaust gas recirculation system (EGR), a muffler, as well as other devices.

For example, an SCR system is a means of converting nitrogen oxides, $NO_x$, with the aid of a catalyst, into diatomic nitrogen, $N_2$, and water, $H_2O$. A reductant, typically anhydrous ammonia, aqueous ammonia, or urea, may be added to an exhaust stream between the DPF and SCR system to allow the reductant to be adsorbed onto the catalyst of the SCR system. Carbon dioxide, $CO_2$, is a reaction product when urea is used as the reductant. Gaseous reductants or fluid reductants may be injected into the exhaust stream. When a fluid reductant is used, such a fluid reductant is known as diesel emission fluid, or DEF. The use of DEF has become popular because of its fluid form, which is easy to store and handle, and it has been found that the use of DEF reduces the need to rely upon EGR to meet modern emission requirements.

SCR systems typically include a DEF reservoir and a DEF injector coupled to the reservoir and positioned upstream of the SCR system. The DEF injector injects DEF into a decomposition space or mixing tube through which an exhaust gas stream flows. Upon injection into the exhaust gas stream, the injected DEF spray is heated by the exhaust gas stream to trigger the decomposition of DEF into ammonia. As the DEF and exhaust gas mixture flows through the decomposition tube, the DEF further mixes with the exhaust gas before entering the SCR system. Ideally, the DEF is sufficiently decomposed and mixed with the exhaust gas prior to entering the SCR system to provide an adequately uniform distribution of ammonia at the inlet face of the SCR system.

In such systems, the tip for the DEF injector can be very sensitive to high temperatures. In particular, it has been found that injector life can be significantly shortened when exposed to high temperatures (generally temperatures exceeding around 120 deg. C.) for prolonged periods of time. Accordingly, DEF injector tips may be provided with a cooling system that is arranged to flow cooling fluid from a coolant source, such as an engine radiator, to and around the injector tip during normal operation. Such a system has been found to effectively prevent the injector tip from prolonged exposure to undesirably high temperatures during regular operations as well as during normal shutdown operations which include a "cool down" period and other protocols allowing the engine, and associated pumps, to continue to run at low-stress conditions for a period of time following heavy use. However, when a shutdown occurs where such protocols cannot be followed (for whatever reason), particularly following strenuous use (known as a "hot" shutdown), the injector tip can be subjected to temperatures 30-40 C above the desired limit thus potentially shortening the life of the injector tip.

Some prior art methods of cooling DEF injector tips in such circumstances have included flowing DEF fluid through the injector tip following shutdown and/or adding cooling fins to the injector to aid in air cooling of the injector tip. For example, US Publication No. 2013/0291523 A1 filed on May 2, 2012 and assigned to Caterpillar, Inc. discloses an apparatus for cooling a DEF injector tip through the use of a heat shield and air cooling provided by a supplementary cooling duct. However, these methods and apparati have been somewhat disadvantageous for multiple reasons, including, but not limited to, deposit formation on the injector tips, waste of DEF fluid, and insufficient cooling.

SUMMARY

In one aspect, the disclosure describes aspects of a system for cooling a DEF injector tip in an SCR system wherein cooling is provided in a "hot" shutdown condition through head pressure created by vaporized cooling fluid vaporized by an existing heat sink in the cooling system. In another aspect, the disclosure describes the use of an existing heat sink in an engine to vaporize cooling fluid thereby causing "backwards" fluid flow through the cooling system to provide passive cooling to the injector tip use in a DEF injector system.

More specifically, in one aspect, the disclosure provides an injector cooling apparatus having a fluid cooling loop for providing cooling to an injector system in a first flow direction during normal operation and a second flow direction during hot shutdown. In accordance with this aspect, the cooling loop may include a cooling fluid base tank, a pump, a supply line providing cooling fluid flow to an injector system, a return line providing cooling fluid flow from the injector system, the return line being fluidically connected to a phase separation tank, and an outlet line fluidically connected between the phase separation tank and a heat sink. The cooling loop being utilized such that, during normal operation, the pump effects cooling fluid flow from the base tank, through the injector system, through the phase separation tank, through the heat sink, and back to the base tank. Conversely, during hot shutdown conditions, wherein the pump is shut off, the heat sink vaporizes cooling fluid located in proximity thereto, thereby forcing cooling fluid backward through the outlet line, through the phase separation tank, through the return line to the injector system such that passive cooling is provided to the injector system.

In another aspect, the disclosure provides an exhaust after-treatment system for a diesel engine including a diesel particulate filter system, a selective catalyst reduction system, a diesel emission fluid injector system, and a fluid cooling loop for providing cooling to the diesel emission fluid injector system. In accordance with such an embodiment, the cooling loop may include a cooling fluid base tank, a pump, a supply line providing cooling fluid flow to the diesel emission fluid injector system, a return line providing cooling fluid flow from the diesel emission fluid injector system, the return line being fluidically connected to a phase separation tank, and an outlet line fluidically connected between the phase separation tank and a heat sink. The cooling loop being utilized such that, during normal operation, the pump effects cooling fluid flow from the base tank, through the diesel emission fluid injector system, through the phase separation tank, through the heat sink, and back to the base tank. Conversely, during hot shutdown conditions, wherein the pump is shut off, the heat sink vaporizes cooling fluid located in proximity thereto, thereby forcing cooling fluid backward through the outlet line, through the phase separation tank, through the return line to the diesel emission fluid injector system such that passive cooling is provided to the diesel emission fluid injector system.

DETAILED DESCRIPTION

Figure 1:
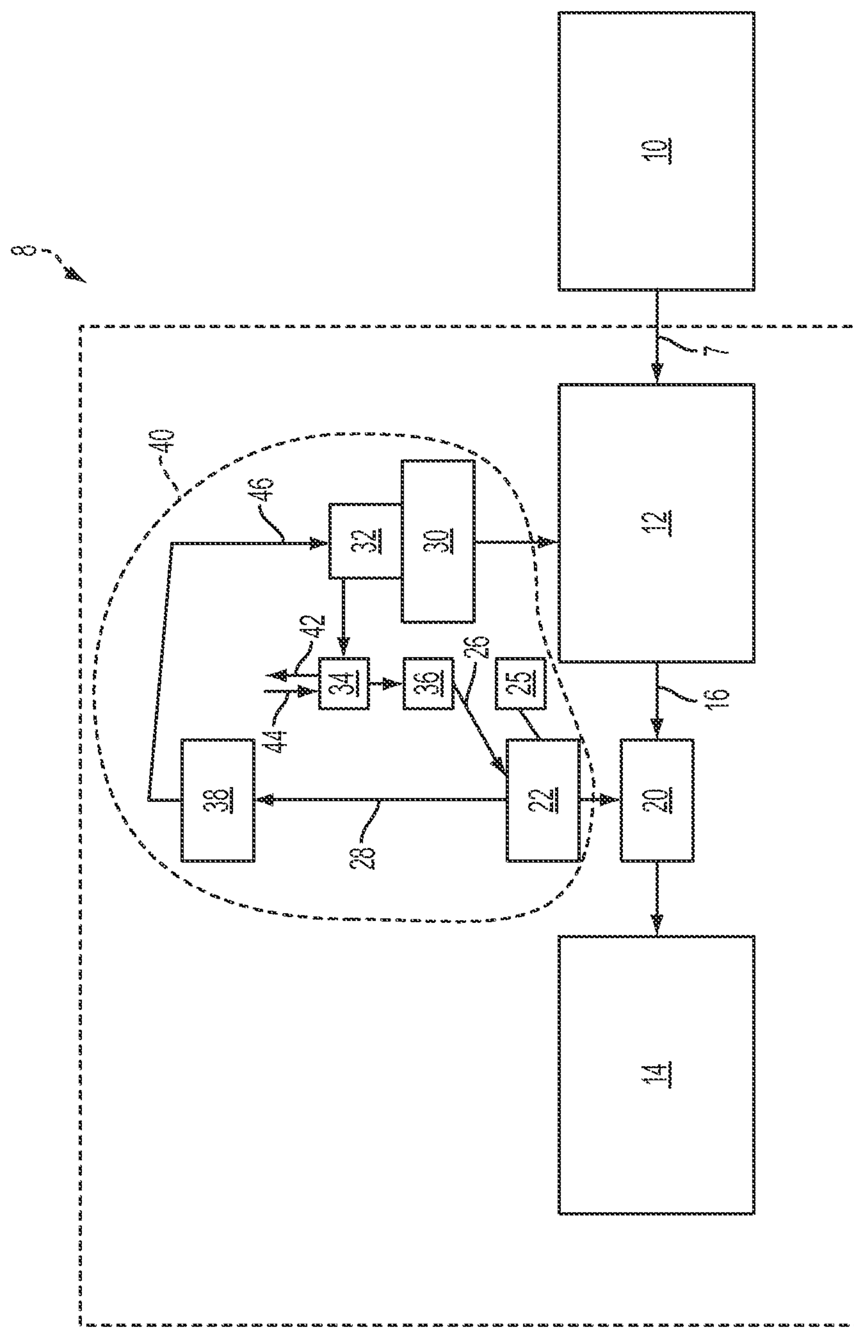
FIG. 1 is a schematic view of an exhaust system for a diesel engine in accordance with one aspect of the present disclosure.

Now referring to the drawings, wherein like reference numbers refer to like elements, FIG. 1 is a block diagram of an exhaust system 8 for use in treating exhaust gases 7 from an exemplary diesel engine 10. The exemplary exhaust system may include, for example, a diesel particulate filter system (DPF) 12 and a selective catalyst reduction (SCR) system 14 for the treatment of the exhaust gases 7 prior to emission to the atmosphere. Specifically, in the disclosed embodiment, exhaust gases 7 from the diesel engine 10 are routed to the DPF system 12 where they are filtered. The treated exhaust gases 16 are then passed to a mixing tube 20. The mixing tube 20 may include a DEF injector system 22 in fluid communication therewith, the DEF injector system 22 having a DEF supply line 24 attached thereto for feeding DEF to an injector tip (not shown), fed by a DEF reservoir 25, and may include a coolant supply line 26 and a coolant return line 28 for providing cooling to the injector tip. In such an arrangement the coolant supply line 26 may be fed from a source of coolant such as a separate base tank 34. The base tank 34 may be provided with cooled cooling fluid from any source including, but not limited to, an existing engine cooling loop including a radiator.

In accordance with the foregoing, the exhaust system 8 may further include a regeneration system 30 for regenerating the filter in the DPF 14. The regeneration system 30 may use combustion as a means for regeneration and may include a regeneration system head 32 requiring cooling. The cooling system for the exhaust system 8 components, such as the regeneration system head 32 (which can reach elevated temperatures during normal operation) and the DEF injector system 22 injector tip may be provided by a base tank 34. The cooling system may include a pump 36, mechanically connected to the engine 10, for feeding fluid from the base tank 34 to the DEF injector system 22 injector tip and onto a phase separation tank 38. The phase separation tank 38 may then be fluidically connected to the regeneration system 30 head 32 by outlet line 46 thereby completing the cooling fluid loop 40.

During normal operation, the pump 36 pumps cooling fluid from the base tank 34 (which may be connected to the engine 10 radiator through inlet 42 and outlet 44 lines as is known in the art to provide consistent cooling), to the DEF injector system 22, to the phase separation tank 38, through the regeneration system head 32, and back to the base tank 34. In this manner, both the regeneration system head 32 and the injector system 22 injector tip are provided with adequate cooling during normal operation. However, in the case of a "hot" shutdown operation, the retained heat in the regeneration system head 32 causes the cooling fluid to vaporize thereby producing a positive head pressure in the phase separation tank 38, thereby forcing cooling fluid flow backwards through coolant return line 28 and back through the injector system 22 thereby providing desired cooling to injector system 22 injector tip. The backward flow of coolant through pump 36 is achievable in systems in which a non-positive displacement pump is utilized. Other possible configurations may utilize a pump having a clutch allowing for reverse flow or, alternatively, a bypass loop around the pump 36 may be incorporated. Regardless, the extreme heat provided by the heat sink, namely the regeneration system head 32 of the regeneration system 30, provides sufficient head pressure in the phase separation tank 38 for a sufficient amount of time to cause coolant flow "backwards" through the cooling loop thereby achieving temperature reductions of 30-40 deg. Celsius at the injector system 22 injector tip in a relatively short amount of time. Additionally, the passive cooling provided as disclosed herein is relatively simple, and does not require the complexity, expense, or additional energy use of a separate after-run pump.

Figure 2:
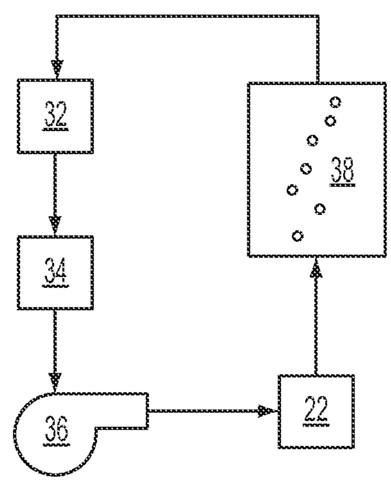
FIG. 2 is a schematic view of a portion of a cooling loop for use in accordance with aspects of the disclosure in connection with the exhaust system shown in FIG. 1.

As shown best in FIG. 2, the phase separation tank 38 outlet line 46, as well as the coolant supply line 26 to the injector system 22, are best positioned relatively high (i.e., at a higher gravitational potential) in the cooling fluid loop 40 with respect to the other components of the loop 40. In this way, a maximum amount of cooling fluid remains trapped in the cooling loop 40 thereby maximizing the amount of fluid movement caused by the head pressure created by the vaporization of cooling fluid in the regeneration system 30 head 32 through the outlet line 46 to the phase separation tank 38 and there backward. Additionally, it is noted that coolant return line 28 may preferably be a relatively short line (i.e. shorter than about 12 inches), and/or of relatively wide cross-section (i.e. wider than about ¼ inches in interior diameter), thereby providing minimal resistance to coolant fluid flow backward from the phase separation tank 38 through the DEF injector system 22.

Figure 3:
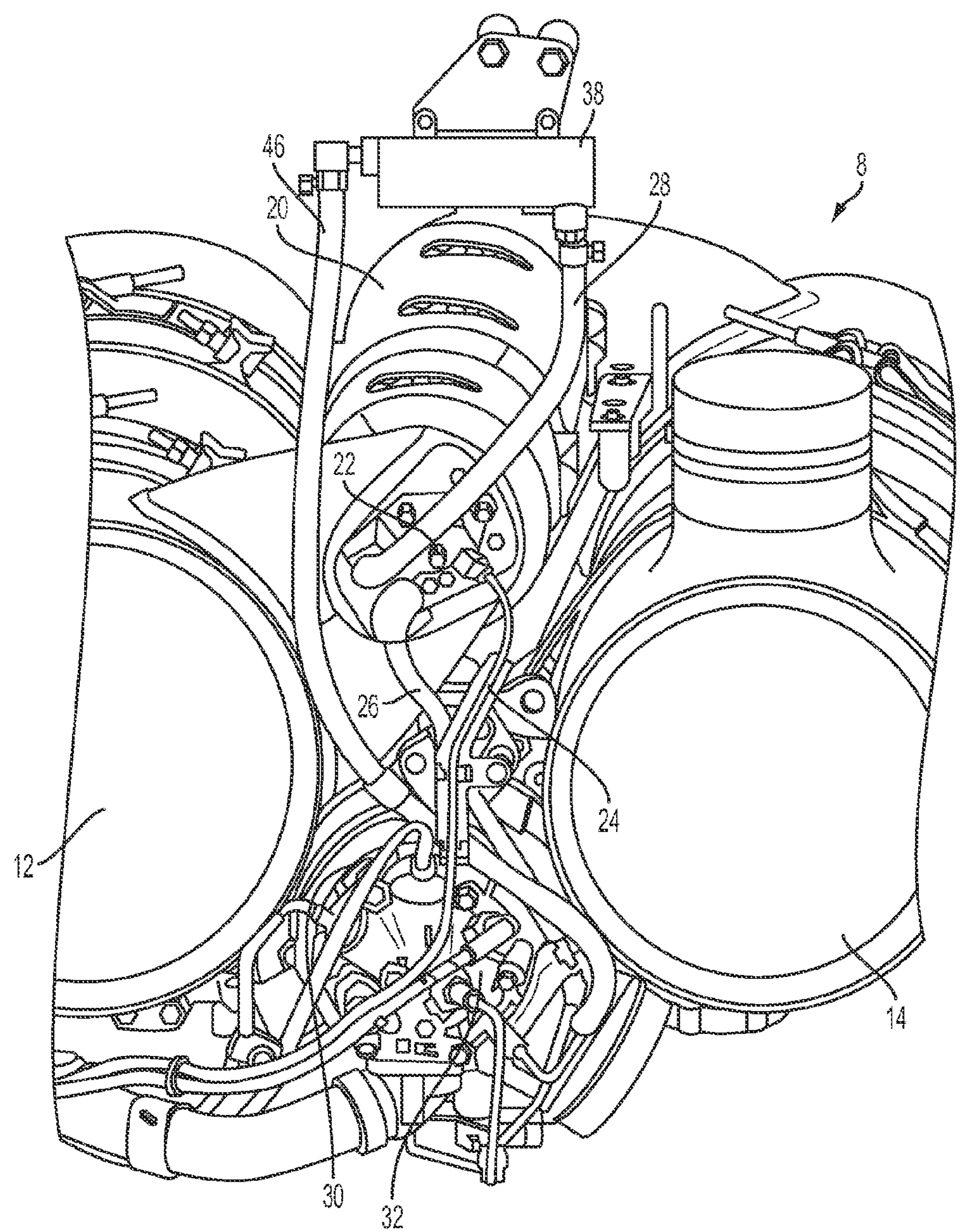
FIG. 3 is a partial perspective view of an exhaust system for a diesel engine that shows, in part, the exhaust after-treatment system of the type for use in accordance with aspects of the present disclosure.

As seen best in FIG. 3, a partial view of an exhaust system 8 of a diesel engine 10 (shown in FIG. 1) is shown according to some aspects of the disclosure. Specifically, the exemplary system may include a DPF 12 and an SCR system 14 for the treatment of the exhaust gases coming from a diesel engine. Also shown is a mixing tube 20, including a DEF injector system 22 in fluid communication therewith, the DEF injector system 22 having a DEF supply line 24 attached thereto for feeding DEF to an injector tip (not shown). A coolant supply line 26 and a coolant return line 28 for providing cooling to the injector tip are also shown. In such an arrangement the coolant supply line 26 may be fed from a source of coolant, for example from an existing engine cooling system fed by the engine radiator or from a separate base tank 34 (shown in FIG. 1).

In accordance with the foregoing, the exhaust system 8 may further include a regeneration system 30 for regenerating a filter in the DPF 14. The regeneration system 30 may use combustion as a means for regeneration and may therefore have a head 32 requiring cooling. In accordance therewith, the return line 28 may be connected to a phase separation tank 38 that is in turn fluidically connected to the regeneration system 30 head 32 by outlet line 46. during normal operation, cooling fluid is flowed to the DEF injector system 22 from the base tank (not shown) through the coolant supply line 26, and thereafter to the phase separation tank 38, and then through the regeneration system 30 head 32 through the phase separation tank 38 outlet line 46, and back to the base tank 34 (shown in FIG. 1). During normal operation in this manner, the coolant temperature is preferably kept such that the coolant remains fluid and does not vaporize. As such, the phase separation tank 38 acts only as a reservoir for coolant, with no phase separation, and coolant fluid flows through the coolant loop 40 in a conventional manner through the use of the pump 36 (shown in FIG. 1).

Thus, in accordance with the disclosure, in the case of a "hot" shutdown operation, the pump is shut off leaving a significant amount of hot, but not vaporized, coolant in proximity to the regeneration system 30 head 32. This extreme heat causes that fluid to vaporize thereby producing a small but significant "backward" flow of coolant fluid through the outlet line 46 into the phase separation tank 38, thereby causing positive head pressure in the phase separation tank 38. This head pressure is significant enough to force cooling fluid (not vaporized) backwards through coolant return line 28 and back through the injector system 22 thereby providing desired cooling to injector system 22 injector tip. Specifically, particularly when utilizing a phase separation tank 38 that is placed above the injector system 22 tip, the amount of fluid vaporized by the regeneration system 30 head 32 (or any other heat sink, particularly one that remains hot during a hot shutdown circumstance) does not need to be large, to provide sufficient head pressure in the phase separation tank 38 to cause temperature reductions of 30-40 deg. Celsius at the injector tip in a relatively short amount of time.

INDUSTRIAL APPLICABILITY

DEF injecting systems are an important part of an overall exhaust after-treatment system as the use of injected DEF may reduce or eliminate the need for exhaust gas recirculation (EGR), or provides additional desired exhaust gas treatment. Accordingly, the use of a cooling system for an injector tip of a DEF injector system is valuable in extending the life of the injector tip, and therefore the overall efficiency of such systems. Additionally, the use of existing heat/energy from an existing heat sink in the engine and/or exhaust system is efficient and results in desired cooling of both the component providing the heat sink as well as cooling of the DEF injector tip.

The many features and advantages of the disclosure are apparent from the detailed specification, and, thus, it is intended by the appended claims to cover all such features and advantages of the disclosure which fall within its true spirit and scope. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

We claim:

1. An injector cooling apparatus comprising:
- a fluid cooling loop for providing cooling to an injector system in a first flow direction during a normal operation and a second flow direction during a hot shutdown, the fluid cooling loop including:
- a cooling fluid base tank;
- a pump;
- a supply line providing cooling fluid flow to the injector system;
- a return line providing cooling fluid flow from the injector system, said return line fluidically connected to a phase separation tank; and
- an outlet line fluidically connected between the phase separation tank and a heat sink;
- wherein, in normal operation, said pump effects cooling fluid flow from said base tank, through said injector system, through said phase separation tank, through said heat sink, and back to said base tank; and
- wherein, during hot shutdown conditions, said pump is shut off, said heat sink vaporizes cooling fluid located in proximity thereto, thereby forcing cooling fluid backward through said outlet line, through said phase separation tank, through said return line to said injector system thereby cooling said injector system.

2. The injector cooling apparatus of claim 1 wherein said injector system is a diesel emission fluid injector system.

3. The injector cooling apparatus of claim 1 wherein said heat sink is a head for a diesel particulate filter regeneration system.

4. The injector cooling apparatus of claim 1 wherein said pump includes a clutch for allowing a backward flow of cooling fluid therethrough.

5. The injector cooling apparatus of claim 1 wherein said phase separation tank is located at a higher gravitational potential than said injector system.

6. The injector cooling apparatus of claim 5 wherein said return line is shorter than 12 inches.

7. The injector cooling apparatus of claim 5 wherein said return line is wider than ¼ inches in interior diameter.

8. An exhaust after-treatment system for a diesel engine comprising:
- a diesel particulate filter system;
- a selective catalyst reduction system;
- a diesel emission fluid injector system;
- a fluid cooling loop for providing cooling to the diesel emission fluid injector system in a first flow direction during a normal operation and a second flow direction during a hot shutdown, the fluid cooling loop including:
- a cooling fluid base tank;
- a pump;
- a supply line providing cooling fluid flow to the diesel emission fluid injector system;
- a return line providing cooling fluid flow from the diesel emission fluid injector system, said return line fluidically connected to a phase separation tank; and
- an outlet line fluidically connected between the phase separation tank and a heat sink;
- wherein, in normal operation, said pump effects cooling fluid flow from said base tank, through said diesel emission fluid injector system, through said phase separation tank, through said heat sink, and back to said base tank; and
- wherein, during hot shutdown conditions, said pump is shut off, said heat sink vaporizes cooling fluid located in proximity thereto, thereby forcing cooling fluid backward through said outlet line, through said phase separation tank, through said return line to said diesel emission fluid injector system thereby cooling said diesel emission fluid injector system.

9. The exhaust after-treatment system for a diesel engine of claim 8 wherein said heat sink is a head for a diesel particulate filter regeneration system.

10. The exhaust after-treatment system for a diesel engine of claim 8 wherein said pump includes a clutch for allowing a backward flow of cooling fluid therethrough.

11. The injector cooling apparatus of claim 8 wherein said phase separation tank is located at a higher gravitational potential than said diesel emission fluid injector system.

12. The exhaust after-treatment system for a diesel engine of claim 8 wherein said return line is shorter than 12 inches.

13. The exhaust after-treatment system for a diesel engine of claim 8 wherein said return line is wider than ¼ inches in interior diameter.

14. A method for cooling an injector apparatus comprising:

providing a fluid cooling loop for an injector system, the cooling loop providing cooling fluid flow in a first flow direction during a normal operation and a second flow direction during a hot shutdown, the fluid cooling loop including:

a cooling fluid base tank;

a pump;

a supply line providing cooling fluid flow to the injector system;

a return line providing cooling fluid flow from the injector system, said return line fluidically connected to a phase separation tank; and an outlet line fluidically connected between the phase separation tank and a heat sink;

operating said cooling loop by pumping cooling fluid using said pump in said first flow direction, during normal operation, from said base tank through said injector system, through said phase separation tank, through said heat sink, and back to said base tank; and following a hot shutdown, including shutdown of said pump, allowing said heat sink to vaporize cooling fluid located in proximity thereto, thereby forcing cooling fluid backward through said outlet line, through said phase separation tank, through said return line to said injector system thereby cooling said injector system.

15. The method for cooling an injector apparatus of claim 14 wherein said provided injector system is a diesel emission fluid injector system.

16. The method for cooling an injector apparatus of claim 14 wherein said provided heat sink is a head for a diesel particulate filter regeneration system.

17. The method for cooling an injector apparatus of claim 14 wherein said provided pump includes a clutch for allowing a backward flow of cooling fluid therethrough.

18. The method for cooling an injector apparatus of claim 14 wherein said provided phase separation tank is located at a higher gravitational potential than said injector system.

19. The method for cooling an injector apparatus of claim 14 wherein said provided return line is shorter than 12 inches.

20. The method for cooling an injector apparatus of claim 14 wherein said provided return line is wider than ¼ inches in interior diameter.

* * * * *